United States Patent
Yang et al.

(10) Patent No.: US 7,885,669 B2
(45) Date of Patent: *Feb. 8, 2011

(54) QUICK PAGING CHANNEL DETECTION WITH SIGNAL TO NOISE RATIO DEPENDENT THRESHOLDS

(75) Inventors: Hong kui Yang, San Diego, CA (US); Jing Su, San Diego, CA (US); Insung Kang, San Diego, CA (US)

(73) Assignee: VIA Technologies, Inc., Taipei (TW)

( * ) Notice: Subject to any disclaimer, the term of this patent is extended or adjusted under 35 U.S.C. 154(b) by 818 days.

This patent is subject to a terminal disclaimer.

(21) Appl. No.: 11/829,658

(22) Filed: Jul. 27, 2007
(Under 37 CFR 1.47)

(65) Prior Publication Data
US 2008/0089259 A1    Apr. 17, 2008

Related U.S. Application Data

(63) Continuation-in-part of application No. 11/492,742, filed on Jul. 25, 2006.

(60) Provisional application No. 60/724,136, filed on Oct. 5, 2005.

(51) Int. Cl.
*H04W 68/00* (2009.01)

(52) U.S. Cl. ........... 455/458; 455/423; 455/434; 455/503; 455/67.13; 455/455; 370/311; 370/324

(58) Field of Classification Search ........... 455/423, 455/458, 432.1–453, 67.11, 67.13, 115.1; 370/311, 324, 503

See application file for complete search history.

(56) References Cited

U.S. PATENT DOCUMENTS

| | | | |
|---|---|---|---|
| 6,639,907 B2 * | 10/2003 | Neufeld et al. | 370/342 |
| 6,687,285 B1 * | 2/2004 | Jou | 375/133 |
| 6,711,413 B1 * | 3/2004 | Heidari | 455/515 |
| 2002/0142784 A1 * | 10/2002 | Abrishamkar et al. | 455/458 |
| 2003/0008691 A1 * | 1/2003 | Chen et al. | 455/574 |
| 2003/0114132 A1 * | 6/2003 | Yue | 455/343 |
| 2005/0020292 A1 * | 1/2005 | Kim | 455/515 |
| 2005/0277429 A1 * | 12/2005 | Laroia et al. | 455/458 |

OTHER PUBLICATIONS

U.S. Appl. No. 11/492,742—Notice of Allowance and Fees Due dated Apr. 27, 2010.

* cited by examiner

*Primary Examiner*—Kamran Afshar
*Assistant Examiner*—Babar Sarwar
(74) *Attorney, Agent, or Firm*—K&L Gates LLP

(57) ABSTRACT

A method and system is disclosed for detecting indicators using a multi-stage and multi-threshold detection mechanism so that a mobile terminal can be removed from an idle mode appropriately.

19 Claims, 3 Drawing Sheets

QUICK PAGING CHANNEL DETECTION WITH SIGNAL TO NOISE RATIO DEPENDENT THRESHOLDS

CROSS REFERENCE

The present application is a continuation-in-part of U.S. application Ser. No. 11/492,742, which was filed on Jul. 25, 2006, and entitled "Method and Apparatus for Multi-Stage Multi-Threshold Detection of Paging Indicator in Wireless Communication Systems", which is herein incorporated by reference in its entirety, and which further claims the benefits of U.S. Provisional Application Ser. No. 60/724,136, which was filed on Oct. 5, 2005.

BACKGROUND

The present invention relates generally to wireless communication systems, and more particularly to a method and system for detecting the presence of on-off signaling in a wireless communications network.

Quick paging channel (QPCH) is an uncoded channel used in CDMA based telecommunication networks for transferring on-off signaling. The channel carries various indicators such as paging indicators, broadcast indicators, and configuration change indicators. The discussion below will use a specific indicator such as the paging indicator as an example, it is understood that whatever can be applied to the paging indicator can also be applied to other indicators carried by the QPCH.

In a wireless communications network, a mobile terminal remains in an idle mode to conserve battery power when there is neither voice nor data call. In the idle mode, the mobile terminal wakes up periodically for a short period typically in the order of milliseconds to monitor a paging indicator to detect whether there is a paging made to the mobile terminal. A relative simple predetermined algorithm is typically used to decide whether the paging indicator indicates that there is an ongoing or an up-and-coming voice or data call. If the outcome of the predetermined algorithm is affirmative, the mobile terminal switches on to decode information communicated through a common channel, which may contain a dedicated or broadcast message in a temporal period of up to 100 ms. If the final determination based on the simple algorithm is negative, the mobile terminal returns to a "sleep mode", wherein most of the mobile terminal's components are turned off to conserve battery power while keeping a few critical components on to maintain basic timing requirement during the "sleep mode". As known by those skilled in the art, the more often the mobile terminal has to decode information in the common channel, the more power the mobile terminal must consume. As such, there is a need to increase standby time, or the amount of time that the mobile terminal is in "sleep mode".

To increase the standby time, a wireless communication system that regularly communicates with the mobile terminal transmits the same paging indicator several times over time to indicate whether there is a paging to the mobile terminal. For example, $3^{rd}$ Generation Partnership Project 2 describes a quick paging channel designed for this purpose in a CDMA2000 environment. "Physical Layer Standard for CDMA2000 Spread Spectrum Systems," 3GPP2 C.S0002, March, 2000. See also, "Upper Layer (Layer 3) Signaling Standard for CDMA2000 Spread Spectrum Systems (2000)", 3GPP2 C.S0005, March, 2000. The QPCH indicators are normally on/off keyed to reduce transmission power. The paging indicators are used to signal the mobile terminal about the presence of a paging message in a predetermined paging slot in the QPCH. If the paging indicator is on, the mobile terminal should wake up and be able to receive the paging. If the paging indicator is off, the mobile terminal can continue to stay in idle to save power. The indicator is repeated once to obtain temporal fading diversity information.

To conserve battery power, it is critical to detect the presence of the paging indicator reliably and efficiently. Due to the presence of noise and fading in aerial communications, the signal-to-noise ratio (SNR) may become very low, a condition that renders any detection mechanism a challenging task. There are generally two types of errors associated with paging. A type I error, a false alarm error, is an incorrect paging detection that may cause a false alarm that in turn causes more battery power. A type II error, a miss error, is an incorrect detection that missed a voice/data call. In wireless communication systems, the detection mechanism has to be designed such that false alarms are minimized without exponentially increasing the miss rate.

A single-stage detection mechanism is disclosed in prior art references wherein one threshold is set for a given false alarm and is to maximize the detection probability. See more in "Fundamentals of Statistical Signal Processing: Detection Theory", Prentice Hall PTR, $1^{st}$ Edition, March 1993. However, because only a single threshold is used while the channel gain ratio is changing, the mechanism cannot feasibly minimize the false alarm and miss rate simultaneously for multi-stage paging indicator detection. Other prior methods, while addressing some of the aforementioned issues, are not efficient in a multi-stage detection of paging indicators.

Existing paging detection methods don't utilize the known Signal-to-Noise Ratio (SNR) information to enhance the detection performance. In fact, most of the designs are usually made for dealing with the worst-case scenario. For example, if the design was to maintain the false alarm probability constant over the operating ranges, the missed detection probability will be virtually zero at a high SNR. Even if it is possible to lower the false alarm probability to a number that is lower than the designed target, practically without sacrificing the missed detection probability at a high SNR, existing methods don't have ways to use different thresholds to change detection performance since existing methods use a fixed threshold regardless of the SNR.

Without an efficient detection mechanism, either more battery power is consumed, or a high miss rate is inevitable, thereby giving a poor communication performance. As such, there exists a need for improving existing methods for detecting paging indicators.

SUMMARY

In view of the foregoing, the following provides a method for detecting a paging indicator in a wireless communication system.

A method and system is disclosed for detecting paging indicators using a multi-stage and multi-threshold detection mechanism so that a mobile terminal can be removed from an idle mode appropriately. After receiving a first paging indicator, it is determined whether a first indicator metric corresponding to the first paging indicator is between a first and a second predetermined threshold. If it is, a second indicator metric is derived based on a second paging indicator, and a predetermined function of the first and second paging indicator metrics is compared against a third predetermined threshold, wherein the first and second predetermined thresholds are based on a square root of a signal-to-noise ratio of the first paging indicator, and the third predetermined threshold is based on a square root of a signal-to-noise ratio corresponding to the second paging indicator.

The construction and method of operation of the invention, however, together with additional objects and advantages thereof will be best understood from the following description of specific embodiments when read in connection with the accompanying drawings.

DESCRIPTION

Figure 1:
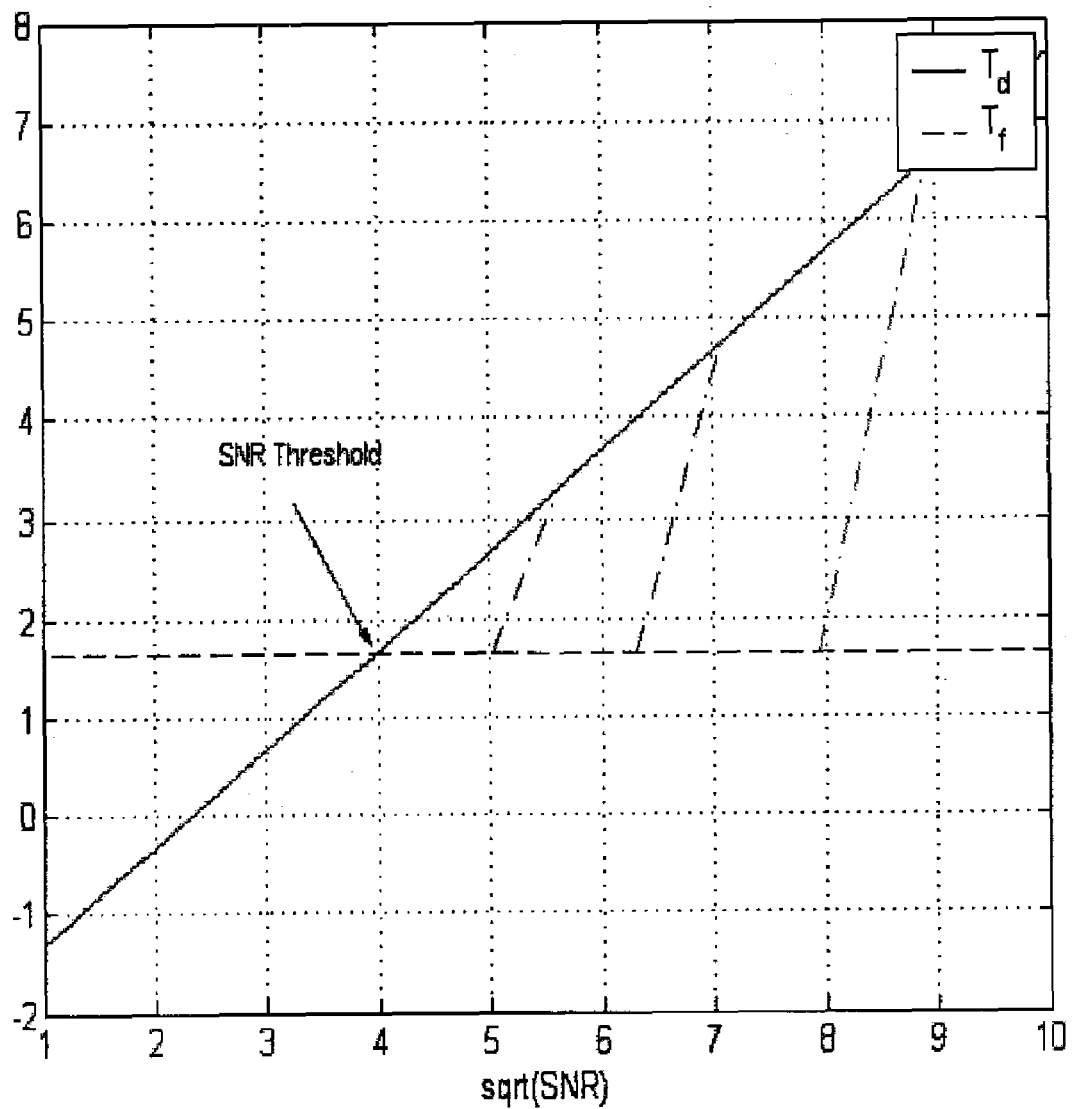
FIG. 1 presents a diagram showing a separation of a signal-to-noise ratio of a paging indicator based on two target thresholds corresponding to a false alarm probability and a missed call probability in accordance with one embodiment of the present invention.

The following will provide a detailed description of a method and system for determining the presence of an indicator carried on a quick paging channel in a wireless communications network. The subject matter set forth herein is applicable to wireless communication systems that multiplex signals using techniques of time division multiplexing (TDM), code division multiplexing (CDM), and frequency division multiplexing (FDM). For explanation purposes, a CDMA2000 system is used as one example. In a wireless communications system such as a CDMA2000 system, several paging indicators are implemented. A paging indicator is understood by those skilled in the art to be a signal for detecting the presence of a paging signal, and to be broadly defined to include but not limited to the following paging indicator examples. For example, a quick paging channel paging indicator is designed for the quick paging channel (QPCH). Another quick paging channel configuration change indicator is designed for the common control channel (CCCH). Yet another quick paging channel broadcast indicator is designed for the broadcast control channel (BCCCH).

The present invention estimates the SNR of the QPCH and computes detection thresholds based on the estimated SNR. The operating range in SNR is divided into two ranges: The high SNR and low SNR ranges. For each range, different decision mechanisms are used with SNR dependent thresholds. For example, in the high SNR range, it is possible to meet both the target missed detection probability and the target false alarm probability with a single threshold since the signal quality is good. In fact, having a high SNR range enables the detector to tailor the detection performance between the missed detection probability and the false alarm probability with a single SNR dependent threshold. More specifically, a binary decision mechanism is used in the high SNR range. In the low SNR range, it is not possible to meet both the target missed detection probability and the target false alarm probability with a single threshold. It is therefore necessary to use two thresholds which introduce an erasure or undetermined state. When a first paging indicator falls into this erasure state, the subsequent paging indicator is tested for detection, possibly combined with the first indicator. Thus a ternary decision mechanism is used within the low SNR range.

According to one embodiment of the present invention, in each paging slot cycle in a CDMA2000 system, two paging indicators, I1 and I2, are transmitted, wherein I2 is a temporal diversity counterpart of I1. These two indicators span over the channel coherence length (about 20 ms) to gain temporal diversity. Assuming that the received symbol signal is expressed as $r_{i,k,l}$, where i is the paging indicator index (1 or 2 for I1 or I2, respectively), k is the index of the multi-path including diversity branch, and l is the quadrature phase shift keying (QPSK) symbol index, where QPSK is understood to be a digital frequency modulation technique for sending digital data over a communication channel, its corresponding estimated radio channel information is $a_{i,k,l}$, which represents the channel condition. Measurement metrics corresponding to the paging indicators can then be obtained through a predetermined combining method. For example, through a simple pilot weighted combining methodology, three normalized measurement metrics (or paging indicator metrics) $x_1$, $x_2$ and $x_3$ are denoted as:

$$x_1 = \frac{\sum_{l=1}^{L}\sum_{k=1}^{K1}(\text{Re}(a_{1,k,l}^* \cdot r_{1,k,l}) + \text{Im}(a_{1,k,l}^* \cdot r_{1,k,l}))}{QPR \cdot \sum_{l=1}^{L}\sum_{k=1}^{K}|a_{1,k,l}|^2} \quad \text{(Eq. 1)}$$

$$x_2 = \frac{\sum_{l=1}^{L}\sum_{k=1}^{K2}(\text{Re}(a_{2,k,l}^* \cdot r_{2,k,l}) + \text{Im}(a_{2,k,l}^* \cdot r_{2,k,l}))}{QPR \cdot \sum_{l=1}^{L}\sum_{k=1}^{K}|a_{2,k,l}|^2} \quad \text{(Eq. 2)}$$

$$x_3 = \frac{\sum_{l=1}^{L}\sum_{k=1}^{K1}(\text{Re}(a_{1,k,l}^* \cdot r_{1,k,l}) + \text{Im}(a_{1,k,l}^* \cdot r_{1,k,l})) + \sum_{l=1}^{L}\sum_{k=1}^{K2}(\text{Re}(a_{2,k,l}^* \cdot r_{2,k,l}) + \text{Im}(a_{2,k,l}^* \cdot r_{2,k,l}))}{QPR\left(\sum_{l=1}^{L}\sum_{k=1}^{K1}|a_{1,k,l}|^2 + \sum_{l=1}^{L}\sum_{k=1}^{K2}|a_{2,k,l}|^2\right)} \quad \text{(Eq. 3)}$$

where K1, K2 are respectively the number of multi-paths (including diversity branches) for I1 and I2, L is the number of QPSK symbols per paging indicator, QPR is a ratio between the powers of the quick paging indicator and a pilot signal and is also known as the channel gain informed by the base station. In CDMA2000 systems, QPR has a mathematical representation of:

$QPR = 10^{(QPCH\_POWER\_LEVEL\_PAGE+3)/20}$ and QPCH_POWER_LEVEL_PAGE which is the paging indicator modulation symbol power level relative to that of the forward pilot channel, which is also defined in CDMA2000 standard.

It is understood that to derive the measurement metrics based on channel gain informed by the base station and the estimated radio channel information provides a significant advantage over the prior art reference. The above described method may be referred to as a pilot weight combining method. Using this method, no explicit noise reduction weights are designed to address the noise issue as the effect of the weighting is already achieved. As it is shown, since the $x_1$, $x_2$ and $x_3$ are all a function of and normalized over QPR, there is an inherent adaptive mechanism built in that can work with any communications systems. The summations corresponding to the radio channel information represented by the above equations provides one normalization process so that the analysis can be simplified. It is also understood that the measurement metrics do not have to be normalized, and in fact, the consideration of QPR can be done while determining thresholds that the measurement metrics are going to be compared against (which will be further explained below). By integrating the considerations of QPR and signal-to-noise ratio (SNR) in the derivation and analysis of these measurement metrics and their corresponding thresholds, both the channel condition and channel configuration are factored in so that the paging detection can be very adaptive to various communication environments.

In another embodiment, wherein a maximal ratio combining methodology is used, three similar normalized indicator metrics $x_1$, $x_2$ and $x_3$ are given as follows:

$$x_1 = \frac{\sum_{l=1}^{L}\sum_{k=1}^{K1}\left(\text{Re}\left(\frac{a_{1,k,l}^* \cdot r_{1,k,l}}{\sigma_{1,k,l}^2}\right) + \text{Im}\left(\frac{a_{1,k,l}^* \cdot r_{1,k,l}}{\sigma_{1,k,l}^2}\right)\right)}{QPR \cdot \sum_{l=1}^{L}\sum_{k=1}^{K}\frac{|a_{1,k,l}|^2}{\sigma_{1,k,l}^2}} \quad \text{(Eq. 1')}$$

$$x_2 = \frac{\sum_{l=1}^{L}\sum_{k=1}^{K2}\left(\text{Re}\left(\frac{a_{2,k,l}^* \cdot r_{2,k,l}}{\sigma_{2,k,l}^2}\right) + \text{Im}\left(\frac{a_{2,k,l}^* \cdot r_{2,k,l}}{\sigma_{2,k,l}^2}\right)\right)}{QPR \cdot \sum_{l=1}^{L}\sum_{k=1}^{K}\frac{|a_{2,k,l}|^2}{\sigma_{2,k,l}^2}} \quad \text{(Eq. 2')}$$

$$x_3 = \frac{\sum_{l=1}^{L}\sum_{k=1}^{K1}\left(\text{Re}\left(\frac{a_{1,k,l}^* \cdot r_{1,k,l}}{\sigma_{1,k,l}^2}\right) + \text{Im}\left(\frac{a_{1,k,l}^* \cdot r_{1,k,l}}{\sigma_{1,k,l}^2}\right)\right) + \sum_{l=1}^{L}\sum_{k=1}^{K2}\left(\text{Re}\left(\frac{a_{2,k,l}^* \cdot r_{2,k,l}}{\sigma_{2,k,l}^2}\right) + \text{Im}\left(\frac{a_{2,k,l}^* \cdot r_{2,k,l}}{\sigma_{2,k,l}^2}\right)\right)}{QPR\left(\sum_{l=1}^{L}\sum_{k=1}^{K1}\frac{|a_{1,k,l}|^2}{\sigma_{1,k,l}^2} + \sum_{l=1}^{L}\sum_{k=1}^{K2}\frac{|a_{2,k,l}|^2}{\sigma_{2,k,l}^2}\right)} \quad \text{(Eq. 3')}$$

where $\sigma_{i,k,l}^2$ is the noise variance for the ith paging indicator, the kth multi-path, and the lth symbol. In this method to derive $x_1$, $x_2$ and $x_3$, the noise is factored in and the weighting applied is also appropriately considered. In general, if the noise is higher, the weighting applied should be lower. As seen from the matrix above, the noise variances are placed in the denominator portions to indicate the "reverse proportionate" relation. In this maximum ratio combining method, specific weights are applied as explained above to reduce the noise interference, thereby improving the performance of the system.

The effective signal-to-noise ratios (SNR) of the paging indicators I1 and I2 are referred to as SNR1 and SNR2, respectively. SNR3 is defined to be the combined SNR for I1 and I2. In communication systems, it is understood by those skilled in the art that the SNR is often determined depending on the characteristics of the mobile terminal demodulator, channel condition, and intrinsic noise. For the purpose of this application SNR are used interchangeably with Eb/Nt, which is the ratio of the energy per bit to the effective noise spectral density, since the QPCH power is known in advance based on the pilot channel power.

Any decision rule for the determination of paging indicators requires some form of SNR estimation. For example, SNR can be estimated from the pilot signal. The total received power-to-interference ratio, $Ec_p/Io$, expressed in dB, wherein $Ec_p$ and Io are the pilot chip energy and the total received input power spectral density including both signal and interference, respectively. This ratio is readily obtained from the mobile terminal searcher. The noise factor represented by SNR is then given by:

$$SNR = QPCH\_Ec/Ioc = (QPR)^2 * Ec_p/Io \quad \text{(Eq. 4)}$$

where $Ec_p$ and Ioc are the chip's energy for the pilot signal and the power spectral density of a band-limited white noise and interference from other cells including multi-path interferences. QPCH_Ec is the total chip energy for the paging indicator. Since $I_o = I_{or} + I_{oc}$, an approximation $I_{oc} \cong \frac{1}{2}I_o$ can be obtained for the bad radio channel condition where $I_{or} \cong I_{oc}$, where the term Ior is the post-channel transmitted power spectral density. In the forward link, Ior is the total transmitted power spectral density for base station(s) in soft handoff. The ratio Ior/Ioc is called geometry in CDMA2000 systems.

Therefore, the SNR approximations for I1 and I2 are as follows:

$$SNR1 = 2R^*(QPR)^2 * Ec_{p1}/Io_1 \quad \text{(Eq. 5)}$$

$$SNR2 = 2R^*(QPR)^2 * Ec_{p2}/Io_2 \quad \text{(Eq. 6)}$$

The SNR approximation for the combined I1 and I2 are as follows:

$$SNR3 = 2R^*(QPR)^2[Ec_{p1}/Io_1 + Ec_{p2}/Io_2] \quad \text{(Eq. 7)}$$

where R=256 or 512 for quick paging channel data rate of 4,800 bps or 2,400 bps, respectively, for the CDMA2000 system. The approximation error is about zero when the signal equals to noise plus interference. The estimation is relatively accurate when the geometry (Ior/Ioc) is low (e.g., from −5 dB to 5 dB), which corresponds to a low SNR region and matters mostly in terms of detection and decoding. In the decision rule discussed below, the decision thresholds are constant at a high SNR region, which corresponds to a high geometry.

The estimated indicator SNR is compared against an SNR threshold that determines the boundary between the high SNR and low SNR ranges. The SNR threshold is the SNR at which both the target false alarm probability and the target missed detection probability can be met in the first indicator detection. The SNR threshold that divides the SNR range into high or low SNR is obtained for the given false alarm probability ($P_F$) and the missed detection probability ($P_{MD}$) by solving the following joint equations:

$$P_F = \frac{1}{\sqrt{2\pi}} \int_T^{\infty} \exp\left(-\frac{x^2}{2}\right) dx \quad \text{(Eq. 8)}$$

$$P_{MD} = \frac{1}{\sqrt{2\pi}} \int_{-\infty}^{T-\sqrt{SNR}} \exp\left(-\frac{x^2}{2}\right) dx$$

where "T" is the threshold and x is the indicator. In essence, T can be derived from a predetermined false alarm probability and the SNR in the above equation is derived based on both T and a predetermined missed detection probability. As such, the threshold is SNR dependant.

FIG. 1 is a graphic representation for showing selection regions for the high SNR range according to one example of the present invention. As shown in FIG. 1, the SNR dependent thresholds can be expressed by a function of the square root of the indicator SNR (which is the horizontal axis). If thresholds are expressed in a linear function, the desired detection performance is obtained by adjusting the slopes and the intercepts of the thresholds. In the high SNR range, only one detection threshold is needed. The threshold ($T_f$) meeting the given false alarm probability is constant (as shown by the dash line) regardless of the SNR while the threshold ($T_d$) meeting the given missed detection probability is a linear function of the square root of SNR (as shown by the solid line). A detection threshold within the high SNR range can be viewed as a non-decreasing function of the square root of SNR in the region between $T_f$ and $T_d$ beyond the intersection of $T_f$ and $T_d$ toward the right. For illustration, this particular region is shaded to show where any detection threshold for high SNR can fit in.

When in the low SNR range, the detection is a multiple stage detection mechanism in which at least two quick paging indicators are detected in a combined way. There will be two thresholds $T_1$ and $T_2$ for detecting the paging indicator based on the SNR, but will have a third threshold $T_3$ for detection based on the combined paging indicators. $T_1$ indicates a boundary for tolerating a missed call while $T_2$ indicates a boundary for tolerating a false alarm. According to one example of the present invention, the detection thresholds determination within the low SNR range can be selected as:

$$T_1 = T_d$$

$$T_2 = T_f$$

$$T_3 = f(T_1, T_2, \sqrt{(E_s/N_t)_1}, \sqrt{(E_s/N_t)_2}) \quad \text{(Eq. 9)}$$

where f is a non-decreasing function.

If the threshold $T_3$ is expressed as a linear function, $T_3$ can be shown as:

$$T_3 = \qquad \text{(Eq. 10)}$$
$$a_3\left(T_1, T_2, \sqrt{(E_s/N_t)_1}\right)\sqrt{(E_s/N_t)_2} + b_3\left(T_1, T_2, \sqrt{(E_s/N_t)_1}\right)$$

wherein the SNR range of $(E_s/N_t)_1$ is divided into several regions with $a_3$ and $b_3$ are pre-computed and saved in memory for given regions.

Figure 2:
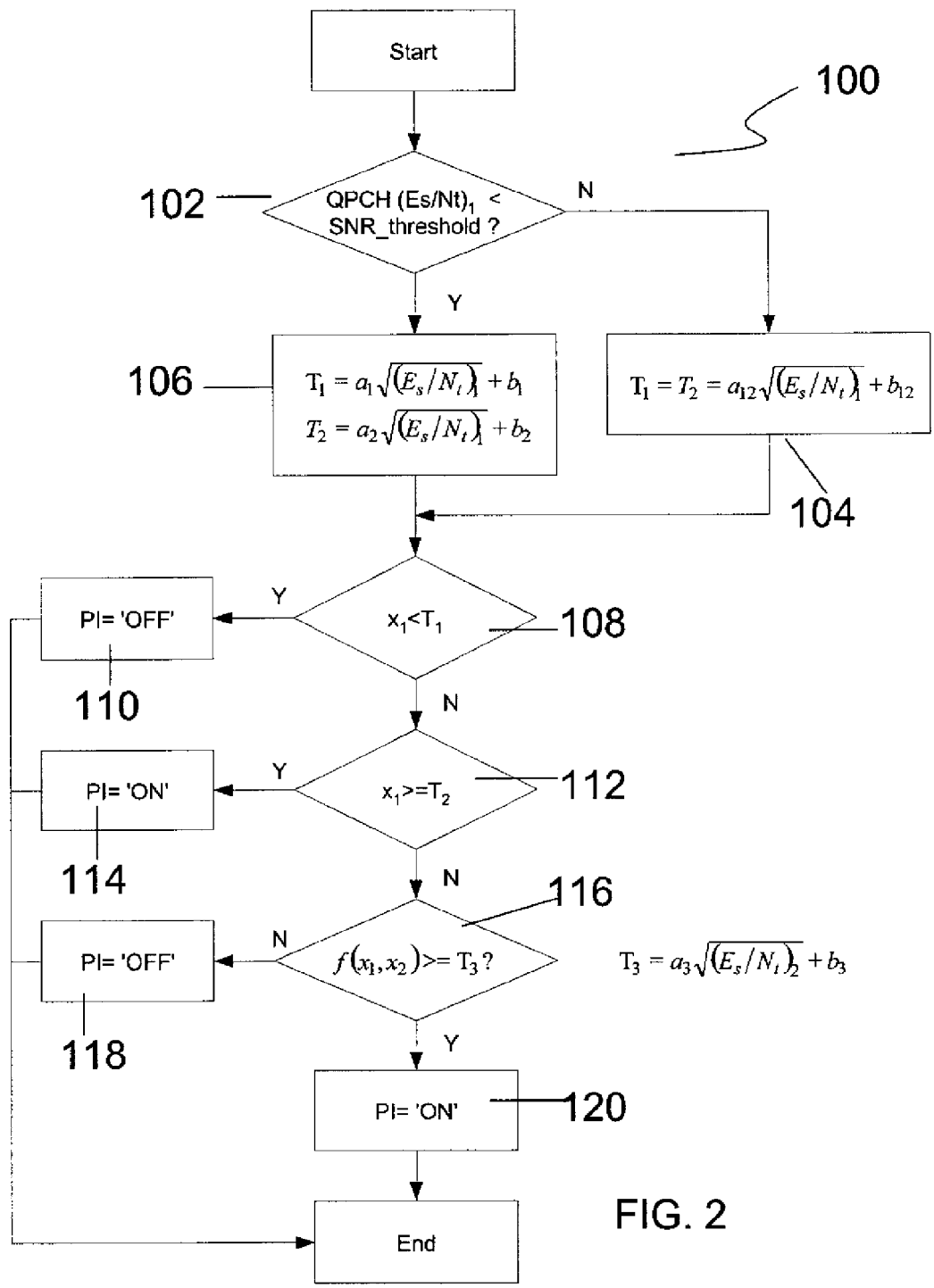
FIG. 2 presents a flow diagram illustrating decisions made for multistage paging indicator detection in accordance with one embodiment of the present invention.

FIG. 2 provides a flow chart 100 illustrating an improved detection process according to one embodiment of the present invention. In FIG. 2, $x_1$ and $x_2$ are the first and second indicator detection metrics, and $x_{12}$ is the combined indicator metric ($x_{12} = w1 \ast x_1 + w2 \ast x_2$ with w1 and w2 being selective weights). $(E_s/N_t)_1$ is the first indicator symbol energy to noise ratio and $(E_s/N_t)_2$ is the second indicator symbol energy to noise ratio. SNR_threshold is the overall SNR threshold, and $T_1$, $T_2$, $T_3$ are three thresholds as discussed above. $a_1$, $a_2$, $a_3$ are constants representing the slopes of the linear function and $b_1$, $b_2$, $b_3$ indicates the intercepts between $T_f$ and $T_d$.

The flow chart 100 starts in a first stage by going through a decision step 102. If the overall SNR of the QPCH (i.e., QPCH(Es/Nt)) is no less than the predetermined overall SNR based threshold SNR_threshold, the values of $T_1$ and $T_2$ will be set as the same, and mathematically will be determined in step 104 as:

$$T_1 = T_2 = a_{12}\sqrt{(E_s/N_t)_1} + b_{12} \quad \text{(Eq. 11)}$$

On the other hand, if the overall SNR of the QPCH (i.e., QPCH(Es/Nt)) is no less than the predetermined overall SNR based threshold SNR_threshold, $T_1$ and $T_2$ are set at different values in step 106, and mathematically is determined as follows:

$$T_1 = a_1\sqrt{(E_s/N_t)_1} + b_1 \text{ and } T_2 = a_2\sqrt{(E_s/N_t)_1} + b_2 \quad \text{(Eq. 12)}$$

It can be seen that, although still only based on the first indicator, the $T_1$ and $T_2$ are set at different values based on the different weight constant a and b. With $T_1$ and $T_2$ set initially, the process moves on to step 108 in which the first indicator detection metric x1 is compared against the set $T_1$, and if it is smaller than $T_1$, the mobile terminal should stay in idle (step 110). If it is determined that the first indicator detection metric x1 is larger than $T_1$ in step 108, it is further determined whether the first indicator detection metric $x^1$ is larger than or equal to $T_2$ in step 112. If it is, there is a strong indication that the mobile terminal should be turned on in step 114. This means that if the first indicator detection metric x1 is larger than both $T_1$ and $T_2$, it is unlikely that it is a false alarm.

In the event that $x_1$ is between $T_1$ and $T_2$, the second detection indicator metric $x_2$ is introduced for further detection. The second detection indicator metric $x_2$ is derived from the second paging indicator I2, which may be a temporal counterpart of the first paging indicator I1. A combined threshold $T_3$ is derived first based on the square root of the SNR of the second paging indicator. That is, $$T_3 = a_3\sqrt{(E_s/N_t)_2} + b_3 \quad \text{(Eq. 13)}$$

wherein $a_3$ and $b_3$ are all predetermined constants that can be stored in the mobile terminal first. A selected non-decreasing function $f$ with $x_1$ and $x_2$ as its variables is then compared against $T_3$ in step 116. If it is determined in step 116 that it is below the threshold $T_3$, the mobile terminal is turned off. Otherwise, it will be turned on in step 120. At this point, the two staged indicator detection process is completed.

It is noticed that in step 102, the SNR_threshold is an artificial dividing line that carves the operating range of the SNR into the high SNR and low SNR ranges. As stated above, if it is in the high SNR range, a single threshold suffices to serve the satisfaction of both the target missed detection probability and the target false alarm probability. On the other hand, if it is below that overall threshold, it is deemed to be in the low SNR range, and the ternary decision process is employed. The two different thresholds $T_1$ and $T_2$ introduce an erasure state in which $x_1$ is larger than $T_1$, but smaller than $T_2$. At this point, it is warranted that a further determination should be introduced as seen in step 116 above that a second indicator is used to further decide whether the mobile terminal should be turned on. It is further noticed that the values of $T_1$, $T_2$, and $T_3$ are all somewhat based on the square root of the SNRs of the respective paging indicators.

Figure 3:
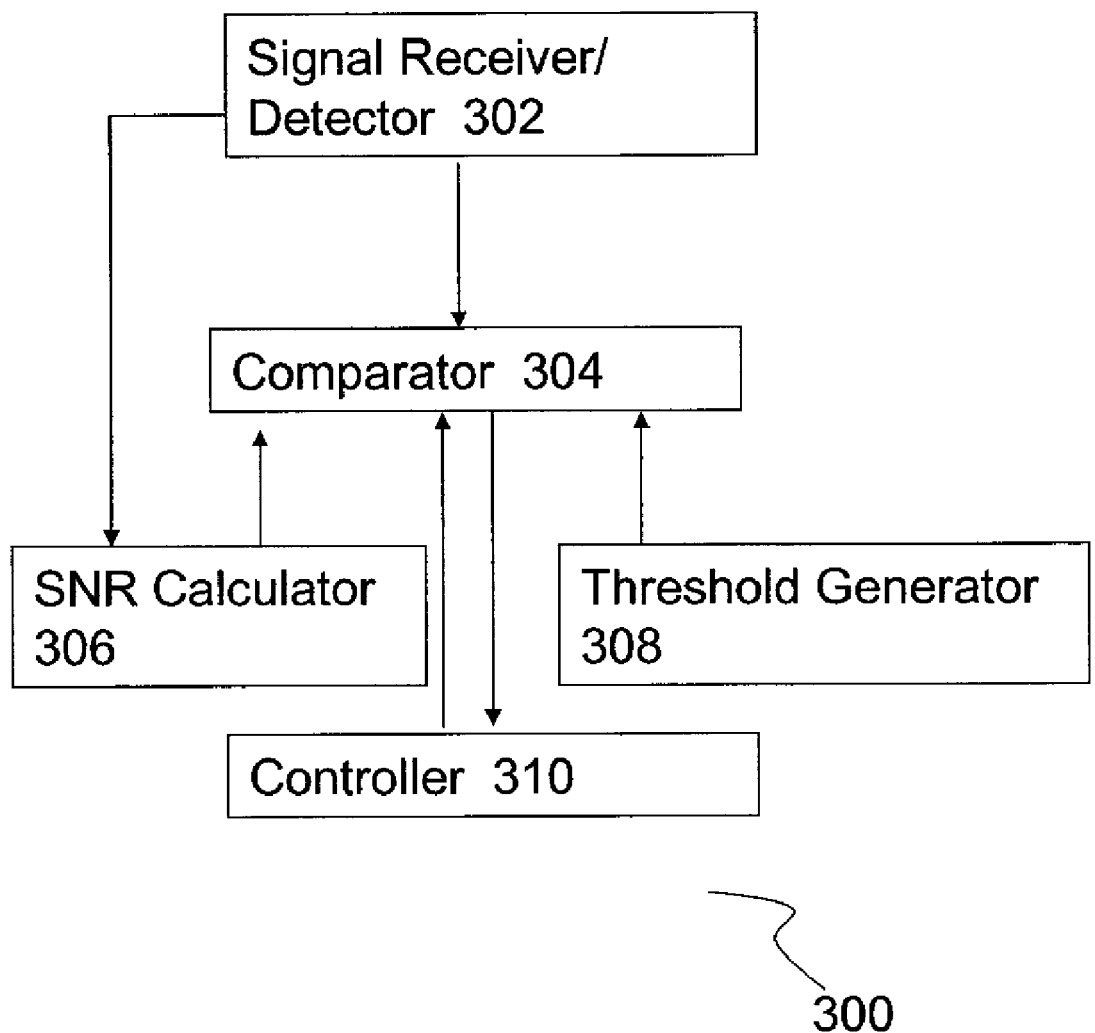
FIG. 3 presents a hardware schematic for implementing the multistage paging indicator detection in accordance with one embodiment of the present invention.

FIG. 3 illustrates a hardware schematic 300 that has various components to achieve the paging indicator detection. There is a signal receiver or detector 302 in the mobile terminal that will receive the QPCH signals as well as other signals from other communication channels such as the pilot channel. At least one comparator module 304 is located in the mobile terminal that will perform the multiple rounds of comparison as stated above. An SNR calculator 306 will provide SNR value based on the received signals, and a threshold generator 308 will perform the processing for calculating the thresholds needed. When the SNR and thresholds are fed into the comparator based on the detected signals, the comparator performs the comparison in coordination of a processing unit such as a microcontroller 310. Based on the comparison result, the controller 310 provides a decision signal for the mobile terminal to wake up or stay idle. It is further understood that the various calculators, generators can be implemented either in hardware or software means. For example, all the processing power can be provided by a microprocessor such as a controller in the mobile terminal without separating it into different units. Alternatively, certain modules can be implemented by separate hardware modules that are operated independently from the controller.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method for detecting paging indicators through a paging channel for removing a mobile terminal from an idle mode in a wireless communication system, the method comprising:
   receiving a first paging indicator (I1);
   determining first and second threshold values ($T_1$ and $T_2$ respectively) based on a signal-to-noise ratio (SNR) of the first paging indicator with the first and second threshold values being different, given the SNR of the first paging indicator is below a predetermined initial SNR threshold;
   deriving a first paging indicator metric ($x_1$) corresponding to the first paging indicator;
   determining in a first stage whether the mobile terminal shall be removed from the idle mode based on comparisons between $x_1$ and $T_1$ and $T_2$ respectively;
   if it cannot be determined whether the mobile terminal shall be removed from the idle mode in the first stage, deriving a second paging indicator metric $x_2$ based on receiving a second paging indicator (I2); and
   determining in a second stage whether the mobile terminal shall be removed from the idle mode based on a comparison between a third threshold $T_3$ and a predetermined function of $x_1$ and $x_2$,
   wherein $T_1$ and $T_2$ are derived based on a square root of the SNR corresponding to the first paging indicator with $T_1$ indicating a boundary for tolerating a miss call and $T_2$ indicating a boundary for tolerating a false alarm, and $T_3$ is derived based on a square root of the SNR corresponding to the second paging indicator.

2. The method of claim 1, wherein the step of determining first and second threshold values further includes defining $T_1$ and $T_2$ as $T_1=a_1\sqrt{(E_s/N_t)_1}+b_1$ and $T_2=a_2\sqrt{(E_s/N_t)_1}+b_2$ wherein $\sqrt{(E_s/N_t)_1}$ is the SNR corresponding to the first paging indicator and $a_1$, $a_2$, $b_1$, $b_2$ are predetermined constants if the SNR of the first paging indicator is below the predetermined initial SNR threshold.

3. The method of claim 1, wherein the step of determining first and second threshold values further includes defining $T_1$ and $T_2$ as: $T_1=T_2=a_{12}\sqrt{(E_s/N_t)_1}+b_{12}$ wherein $\sqrt{(E_s/N_t)_1}$ is the SNR corresponding to the first paging indicator and $a_{12}$ and $b_{12}$ are predetermined constants if the SNR of the first paging indicator is above the predetermined initial SNR threshold.

4. The method of claim 1, wherein the third threshold $T_3$ is determined as $T_3=a_3\sqrt{(E_s/N_t)_2}+b_3$ wherein $\sqrt{(E_s/N_t)_2}$ is the SNR corresponding to the second paging indicator and $a_3$ and $b_3$ are predetermined constants.

5. The method of claim 1, wherein the predetermined function of $x_1$ and $x_2$ is a predetermined non-reduction function.

6. The method of claim 1, wherein the second paging indicator I2 is a temporal diversity counterpart of the first paging indicator I1.

7. The method of claim 1, wherein the step of the determining the first threshold value is further based on the SNR of the paging channel.

8. A system for detecting paging indicators through a paging channel for removing a mobile terminal from an idle mode in a wireless communication system, the method comprising:
   a receiver for receiving first and second paging indicators (I1 and I2);
   a threshold generator for determining first and second threshold values ($T_1$ and $T_2$ respectively) based a signal-to-noise ratio (SNR) of the first paging indicator with the first and second threshold values being different, given the SNR of the first paging indicator is below a predetermined initial SNR threshold;
   a processor for deriving a first paging indicator metric $x_1$ corresponding to the first paging indicator or a second paging indicator metric $x_2$ based on a second paging indicator (I2) received;
   a comparator for determining in a first stage whether the mobile terminal shall be removed from the idle mode based on comparisons between $x_1$ and $T_1$ and $T_2$ respectively, and for determining in a second stage whether the mobile terminal shall be removed from the idle mode based on a comparison between a third threshold $T_3$ and a predetermined function of $x_1$ and $x_2$ if it cannot be determined whether the mobile terminal shall be removed from the idle mode in the first stage,
   wherein $T_1$ and $T_2$ are derived based on a square root of the SNR corresponding to the first paging indicator with $T_1$ indicating a boundary for tolerating a miss call and $T_2$ indicating a boundary for tolerating a false alarm, and $T_3$ is derived based on a square root of the SNR corresponding to the second paging indicator.

9. The system of claim 8, wherein the second paging indicator I2 is a temporal diversity counterpart of the first paging indicator I1.

10. The system of claim 8, wherein the first and second threshold values are defined as $T_1$ and $T_2$ as $T_1=a_1\sqrt{(E_s/N_t)_1}+b_1$ and $T_2=a_2\sqrt{(E_s/N_t)_1}+b_2$ wherein $\sqrt{(E_s/N_t)_1}$ is the SNR corresponding to the first paging indicator and $a_1$, $a_2$, $b_1$, $b_2$ are predetermined constants if the SNR of the first paging indicator is below the predetermined initial SNR threshold.

11. The system of claim 8, wherein the first and the second threshold values $T_1$ and $T_2$ are set as the same and as $T_1=T_2=a_{12}\sqrt{(E_s/N_t)_1}+b_{12}$ wherein $\sqrt{(E_s/N_t)_1}$ is the SNR corresponding to the first paging indicator and $a_{12}$ and $b_{12}$ are predetermined constants if the SNR of the first paging indicator is above the predetermined initial SNR threshold.

12. The system of claim 8, wherein the third threshold $T_3$ is determined as $T_3=a_3\sqrt{(E_s/N_t)_2})+b_3$ wherein $\sqrt{(E_s/N_t)_2}$ is the SNR corresponding to the second paging indicator and $a_3$ and $b_3$ are predetermined constants.

13. The system of claim 8, wherein the predetermined function of $x_1$ and $x_2$ is a predetermined non-reduction function.

14. The system of claim 8, wherein the threshold generator of determining the first threshold value is further based on the SNR of the paging channel.

15. A method for detecting paging indicators through a paging channel for removing a mobile terminal from an idle mode in a wireless communication system, the method comprising: measuring a channel signal-to-noise ratio (SNR) of the paging channel; providing a channel SNR threshold of the paging channel; receiving a first paging indicator (I1) determining a first threshold value (T1) based on a signal-to-noise ratio (SNR) of the first paging indicator in response to the comparison of the channel SNR with the channel threshold; deriving a first paging indicator metric (X1) corresponding to the first paging indicator; and determining in a first stage whether the mobile terminal shall be removed from the idle mode based on comparisons between X1 and T1; determining a second threshold value (T2) based on the SNR of the first paging indicator with the first and the second threshold values being different if the SNR of the first paging indicator is below a predetermined initial SNR threshold, and deriving a second paging indicator metric X2 based on receiving a second paging indicator (I2), given it cannot be determined whether the mobile terminal shall be removed from the idle mode in the first stage; and determining in a second stage whether the mobile terminal shall be removed from the idle mode based on a comparison between a third threshold T3 and a predetermined function of X1 and X2, wherein T1 and T2 are derived based on a square root of the SNR corresponding to the first paging indicator, and T3 is derived based on a square root of the SNR corresponding to the second paging indicator, and wherein the second paging indicator I2 is a temporal diversity counterpart of the first paging indicator I1.

16. The method of claim 15, wherein the steps of determining first and second threshold values further includes defining $T_1$ and $T_2$ as $T_1 = a_1\sqrt{(E_s/N_t)_1} + b_1$ and $T_2 = a_2\sqrt{(E_s/N_t)_1} + b_2$ wherein $\sqrt{(E_s/N_t)_1}$ is the SNR corresponding to the first paging indicator and $a_1, a_2, b_1, b_2$ are predetermined constants if the SNR of the first paging indicator is below the predetermined initial SNR threshold.

17. The method of claim 15, wherein the step of determining first and second threshold values further includes defining $T_1$ and $T_2$ as $T_1 = T_2 = a_{12}\sqrt{(E_s/N_t)_1} + b_{12}$ wherein $\sqrt{(E_s/N_t)_1}$ is the SNR corresponding to the first paging indicator and $a_{12}$ and $b_{12}$ are predetermined constants if the SNR of the first paging indicator is above the predetermined initial SNR threshold.

18. The method of claim 15, wherein the third threshold $T_3$ is determined as $T_3 = a_3\sqrt{(E_s/N_t)_2} + b_3$ wherein $\sqrt{(E_s/N_t)_2}$ is the SNR corresponding to the second paging indicator and $a_3$ and $b_3$ are predetermined constants.

19. The method of claim 15, wherein the predetermined function of $x_1$ and $x_2$ is a predetermined non-reduction function.

* * * * *